United States Patent
De Buitléir

(10) Patent No.: US 11,424,999 B2
(45) Date of Patent: Aug. 23, 2022

(54) METHOD AND APPARATUS FOR KEY PERFORMANCE INDICATOR FORECASTING USING ARTIFICIAL LIFE

(71) Applicant: Telefonaktiebolaget LM Ericsson (publ), Stockholm (SE)

(72) Inventor: Amy De Buitléir, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 87 days.

(21) Appl. No.: 16/487,374

(22) PCT Filed: Mar. 9, 2017

(86) PCT No.: PCT/EP2017/055600
§ 371 (c)(1),
(2) Date: Aug. 20, 2019

(87) PCT Pub. No.: WO2018/157951
PCT Pub. Date: Sep. 7, 2018

(65) Prior Publication Data
US 2020/0059417 A1    Feb. 20, 2020

(30) Foreign Application Priority Data

Mar. 1, 2017 (WO) ................. PCT/EP2017/054827

(51) Int. Cl.
*H04L 41/5009* (2022.01)
*H04L 41/147* (2022.01)
(Continued)

(52) U.S. Cl.
CPC ........ *H04L 41/5009* (2013.01); *H04L 41/147* (2013.01); *H04L 41/16* (2013.01); *H04L 43/08* (2013.01); *H04L 43/16* (2013.01)

(58) Field of Classification Search
CPC ... H04L 41/0823; H04L 41/147; H04L 41/16; H04L 41/5009; H04L 43/08; H04L 43/16
See application file for complete search history.

(56) References Cited

U.S. PATENT DOCUMENTS

| 10,572,796 B2 * | 2/2020 | AlSaud | ..................... G06N 3/08 |
| 2010/0077077 A1 * | 3/2010 | Devitt | ..................... H04L 41/22 709/224 |

(Continued)

FOREIGN PATENT DOCUMENTS

| CN | 101675648 A | 3/2010 |
| CN | 102289455 A | 12/2011 |

(Continued)

OTHER PUBLICATIONS

PCT International Search Report for International application No. PCT/EP2017/055600—dated Sep. 13, 2017.

(Continued)

*Primary Examiner* — Raj Jain
*Assistant Examiner* — M Mostazir Rahman
(74) *Attorney, Agent, or Firm* — Baker Botts, LLP

(57) ABSTRACT

A method for controlling operation of a communications network based on predicting a value of a first Key Performance Indicator, KPI. The method comprises maintaining (102) a plurality of machine-learning processes, wherein an individual machine-learning process operates based on a data model and decision-making rules making up a predicting logic of said individual machine-learning process. The plurality 10 of machine-learning processes operate based on a plurality of different data models and a plurality of different decision-making rules. The method further comprises receiving (104) a stream of values of Key Performance Indicators, KPIs, obtained from network elements of the communications network and predicting (106) a plurality of future values of said first KPI, wherein the future values (Continued)

of said first KPI refer to the same point in 15 time. Further the method comprises combining (108) the individual predictions into a single predicted value of the first KPI and triggering (112) a network management operation if the single predicted first KPI value is equal to or exceeds a first threshold (110).

17 Claims, 6 Drawing Sheets

(51) Int. Cl.
*H04L 41/16* (2022.01)
*H04L 43/08* (2022.01)
*H04L 43/16* (2022.01)

(56) References Cited

U.S. PATENT DOCUMENTS

| | | | |
|---|---|---|---|
| 2014/0120930 A1 | 5/2014 | Harris et al. | |
| 2016/0285700 A1 | 9/2016 | Gopalakrishnan et al. | |
| 2017/0322917 A1* | 11/2017 | Goyal | G06Q 30/0242 |
| 2018/0196400 A1* | 7/2018 | Kobayashi | G06Q 10/06393 |
| 2019/0065298 A1* | 2/2019 | Leverich | G06F 11/079 |

FOREIGN PATENT DOCUMENTS

| | | |
|---|---|---|
| CN | 103178990 A | 6/2013 |
| CN | 105634787 A | 6/2016 |
| CN | 105987822 A | 10/2016 |
| EP | 3 131 234 A1 | 2/2017 |
| WO | 2016 082859 A1 | 6/2016 |

OTHER PUBLICATIONS

Wains: A Pattern-Seeking Artificial Life Species by Amy de Buitleir et al.; 2012 Massachusetts Institute of Technology; Artificial Life 18: 399-423—2012.

PCT Written Opinion of the International Searching Authority for International application No. PCT/EP2017/055600—dated Sep. 13, 2017.

Chinese Office Action issued for Application No. 201780087777.8—dated Sep. 24, 2021.

Chinese Search Report issued for Application No. 2017800877778—dated Sep. 17, 2021.

* cited by examiner

METHOD AND APPARATUS FOR KEY PERFORMANCE INDICATOR FORECASTING USING ARTIFICIAL LIFE

PRIORITY

This nonprovisional application is a U.S. National Stage Filing under 35 U.S.C. § 371 of International Patent Application Serial No. PCT/EP2017/055600 filed Mar. 9, 7017 and entitled "A Method and Apparatus for Key Performance Indicator Forecasting Using Artificial Life" which claims priority to International Patent Application Serial No. PCT/EP2017/054827 filed Mar. 1, 2017 both of which are hereby incorporated by reference in their entirety.

TECHNICAL FIELD

The present invention relates to Key Performance Indicators, KPIs, of a communications network, in general, and in particular to prediction of KPI values by data mining using artificial life species.

BACKGROUND

Communications network operators and Network Operation Centers continuously collect and monitor performance data and key performance indicators (KPIs) for the network elements (NEs) in order to measure the performance and reliability of the managed network. KPIs give the operators quantifiable metrics that help them to optimise the network Quality of Service (QoS) and satisfy Service Level Agreements (SLAs). Operators define alarms that are triggered when predetermined thresholds of specific KPIs are breached. When the alarm is triggered, the operators take appropriate actions to deal with the issue that caused the trouble condition. However, configuring alarms is problematic. If the alarm is too sensitive, it can trigger in response to conditions that are self-correcting, making it less useful. If the alarm is not sensitive enough, the underlying condition may be well underway before the operators are notified, causing a delay in correcting the problem.

Most existing solutions focus on detecting alarm conditions. Alternatively, quantitative forecasting methods could be used in this scenario, since past KPI values are available. Commonly used algorithms and approaches for quantitative forecasting include:
  moving averages (often time-weighted)
  Kalman filtering (linear quadratic estimation)
  exponential smoothing
  autoregressive moving-average (ARMA)
  autoregressive integrated moving average (ARIMA)
  extrapolation
  line (or curve) fitting
  variations and extensions of the above algorithms
  machine learning Most quantitative forecasting methods are inflexible when it comes to weighing older data against newer data. Some methods treat all data equally, regardless of age. Other methods give more weight to recent data, but the weighting is fixed. Such methods do not cope well with patterns that happen infrequently. For example, consider two time-varying values, A and B, where we are interested in predicting A. Suppose the value for A is relatively constant most of the time, but when B crosses some threshold, which happens infrequently, the value of A spikes. Most methods would do poorly at detecting this pattern and making accurate predictions.

Most quantitative forecasting methods and machine learning systems must be configured (e.g. by choosing weights or learning function parameters). It is not always obvious what the optimal configuration is. Furthermore, if the pattern characteristics of the system changes over time, the configuration may need to be modified.

SUMMARY

It is the object of the present invention to obviate at least some of the above disadvantages and provide an improved method and apparatus for prediction of values of Key Performance Indicators in a communications network.

It would be convenient to have an apparatus that can predict trouble conditions before they occur. This would allow the operators to gather the resources required to fix the problem, possibly preventing problems before they occur, or at least reducing the duration of problems.

Accordingly, the invention seeks to preferably mitigate, alleviate or eliminate one or more of the disadvantages mentioned above singly or in any combination.

According to a first aspect of the present invention there is provided a method for controlling operation of a communications network based on predicting a value of a first Key Performance Indicator, KPI. The method comprises maintaining a plurality of machine-learning processes (MLPs), wherein an individual machine-learning process (MLP) operates based on a data model and decision-making rules. The plurality of machine-learning processes operate based on a plurality of different data models and a plurality of different decision-making rules. The method further comprises receiving a stream of values of Key Performance Indicators, KPIs, obtained from network elements of the communications network and predicting by the plurality of machine-learning processes, based on previously received values of KPIs and using the data models and decision-making rules, a plurality of future values of said first KPI, wherein the future values of said first KPI refer to the same point in time. The method also comprises combining the individual predictions into a single predicted value of the first KPI and triggering a network management operation if the single predicted first KPI value is equal to or exceeds a first threshold.

According to a second aspect of the present invention there is provided an apparatus for controlling operation of a communications network based on predicting a value of a first Key Performance Indicator, KPI. The apparatus comprises a processor and a memory, the memory containing instructions executable by the processor such that the apparatus is operative to maintain a plurality of machine-learning processes. An individual machine-learning process operates based on a data model and decision-making rules, wherein the plurality of machine-learning processes operate based on a plurality of different data models and a plurality of different decision-making rules. The apparatus is operative to receive a stream of values of Key Performance Indicators, KPIs, obtained from network elements of the communications network and to predict by the plurality of machine-learning processes a plurality of future values of said first KPI, wherein the future values of said first KPI refer to the same point in time. The prediction is based on previously received values of KPIs and use the data models and decision-making rules. Further, the apparatus is operative to combine the individual predictions into a single predicted value of the first KPI and trigger a network management operation if the single predicted first KPI value is equal to or exceeds a first threshold.

According to a third aspect of the present invention there is provided an apparatus for controlling operation of a communications network based on predicting a value of a first Key Performance Indicator, KPI. The apparatus comprises a receiver for receiving a stream of values of Key Performance Indicators, KPIs, obtained from network elements of the communications network and a plurality of machine-learning processes for predicting a plurality of future values of said first KPI referring to the same point in time. An individual machine-learning process operates based on a data model and decision-making rules, wherein the plurality of machine-learning processes are adapted to operate based on a plurality of different data models and a plurality of different decision-making rules and to make the predictions based on previously received values of KPIs and using the data models and decision-making rules. The apparatus also comprises a combiner for combining the individual predictions into a single predicted value of the first KPI and a trigger for triggering a network management operation if the single predicted first KPI value is equal to or exceeds a first threshold.

Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

It is possible to create a machine-learning process and an apparatus that uses a plurality of such machine-learning processes for data mining. These machine-learning processes can be described as an example of an artificial life species; their role is data mining.

As the machine-learning processes receive data, they build a model of it, classify new data based on the model, and choose a response from a set of predetermined actions. The machine-learning processes continuously lose energy (a "metabolism" cost). In order to stay alive, they must earn energy by choosing appropriate responses. The definition of an "appropriate" response depends on the specific data mining task that the machine-learning processes are assigned to. The energy is a parameter characterising individual machine-learning process. When a machine-learning process loses more energy than it earns at some point it ceases to exist, or in analogy to biological life, it dies.

De Buitléir et al. [1] demonstrated that a population of machine-learning processes, called wains, can indeed discover patterns, make decisions based on those patterns, and adapt to changes in the pattern characteristics of the data. Individual wains learned to make better decisions during their lifetimes, and evolution optimised the operating parameters of their learning and decision-making rules for the data mining task over a few generations.

Figure 1:
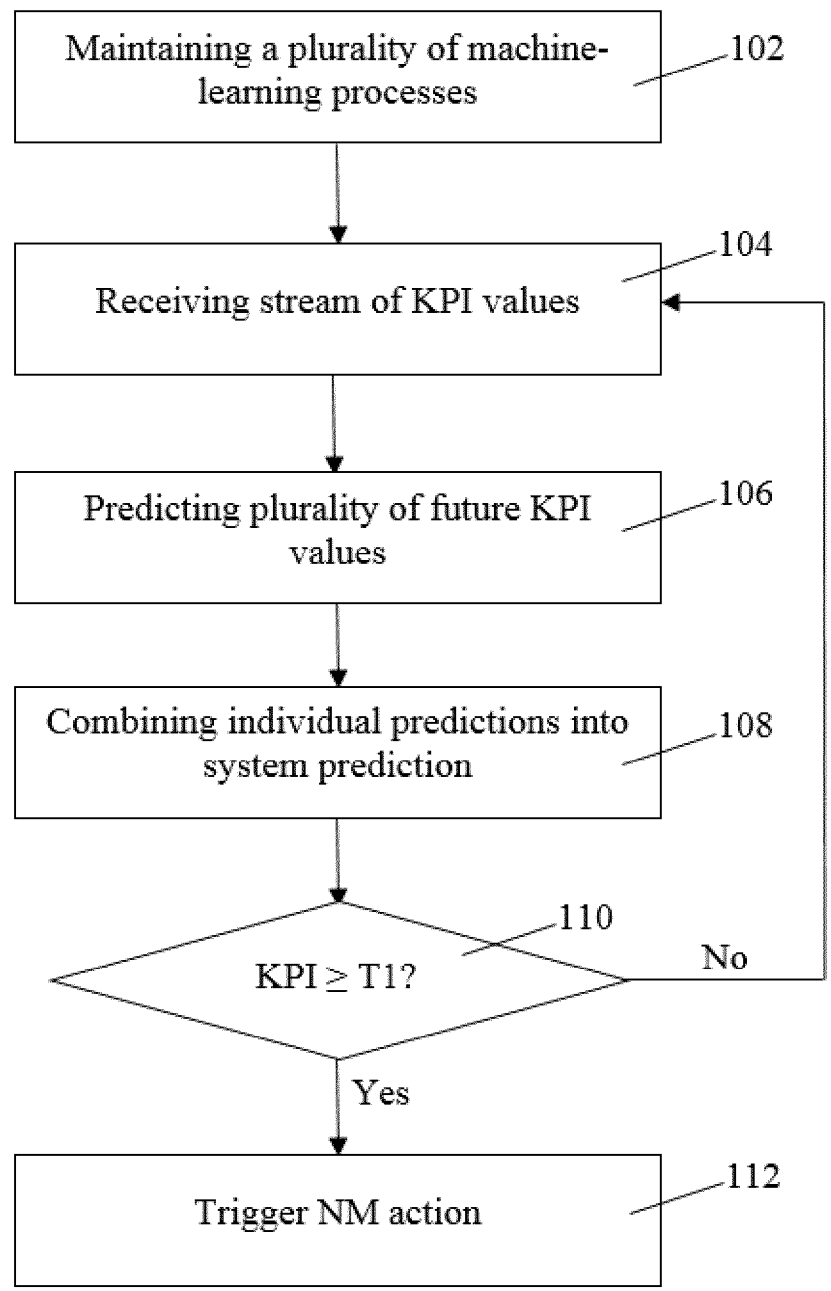
FIG. 1 is a flowchart illustrating an embodiment of a method for controlling operation of a communications network based on predicting a KPI value.

With reference to FIG. 1 an embodiment of a method for controlling operation of a communications network based on predicting a value of a first Key Performance Indicator, KPI, is now to be described.

In telecommunications Key Performance Indicators (KPI) are metrics indicative of performance of the network. One of these performance indicators may be, for example, network latency. Other examples may include lost packets, jitter, data rate throughput of various elements of the network and many other depending on type of networks and services running on the network.

The method comprises maintaining, 102, a plurality of machine-learning processes, wherein an individual machine-learning process operates based on a data model and decision-making rules. The data model and decision-making rules make up a predicting logic of said individual machine-learning process. The plurality of machine-learning processes operate based on a plurality of different data models and a plurality of different decision-making rules. In different embodiments many different combinations of the data models and decision-making rules may be used. The method further comprises receiving a stream of values of Key Performance Indicators, KPIs, obtained from network elements of the communications network. The KPI values are presented to the population of machine-learning processes as they become available. In the following step the method comprises predicting, 106, by the plurality of machine-learning processes, based on previously received values of KPIs and using the predicting logic, a plurality of future values of said first KPI. The future values of said first KPI predicted by the plurality of the machine-learning processes refer to the same point in time. In a preferred embodiment each machine-learning process in the population of deployed machine-learning processes makes its own prediction and for n machine-learning processes we receive n predicted values of the first KPI. The method then comprises combining, 108, the individual predictions into a single predicted value of the first KPI and triggering, 112, a network management operation if the single predicted first KPI value is equal to or exceeds a first threshold, 110.

The machine-learning processes are capable of predicting KPI values after being deployed based on their data models and decision-making rules. The initial predictions, however, may not very accurate. The machine-learning processes must first be trained and adjust to the specific environment of the communications network where they are deployed. To train machine-learning processes to perform a task such as predicting future values of a particular KPI, as explained earlier, we present the values of all KPIs as they become available, to the machine-learning processes. The machine-learning processes then choose an action from a set of actions, where each action makes a prediction of future values of the KPI of interest. When a new value for the KPI becomes available, it is used to determine which ones of the machine-learning processes receive the energy reward. Depending on embodiment, this reward might be given for the n most accurate predictions, or for all predictions that are sufficiently near the actual value.

Figure 2:
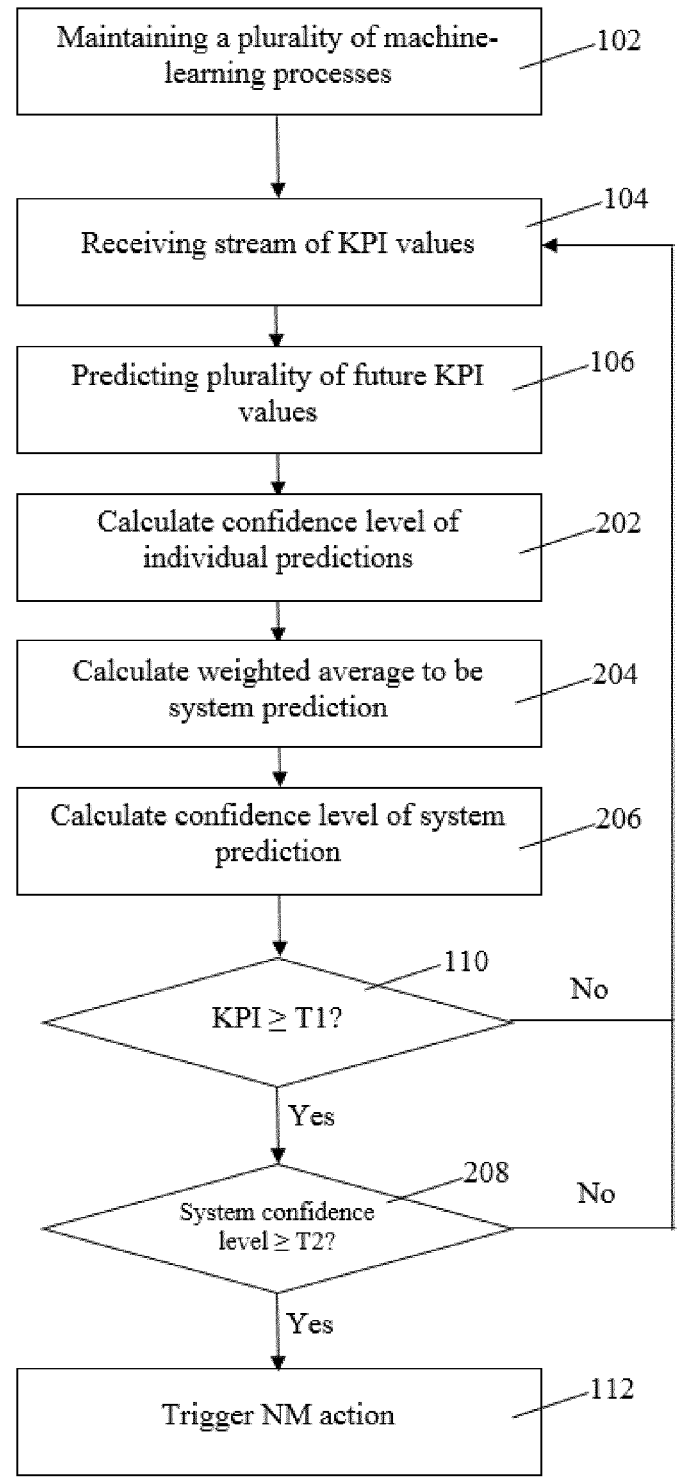
FIG. 2 is a flowchart illustrating an alternative embodiment of a method for controlling operation of a communications network based on predicting a KPI value.

In a preferred embodiment, illustrated in FIG. 2, the single predicted value of the first KPI is calculated as a weighted average, 204, wherein a weight of an individual prediction depends at least on a confidence level of said individual prediction, 202.

The method in one embodiment comprises determining confidence level of the single predicted value of the first KPI, 206. Preferably, the confidence level of the single predicted value of the first KPI, 206, is an average of the confidence levels of the individual predictions, which fell within a predefined range around the single predicted value of the KPI. The width of said range may be defined for specific implementation or specific KPI and in one embodiment it may be from 0.9 $KPI_{SP}$ to 1.1 $KPI_{SP}$, where $KPI_{SP}$ is the single predicted value of the first KPI. This, however, is just an example and different widths of the range than ±10% around the single predicted value of the first KPI can be envisaged. Preferably, the network management operation is triggered, 112, if the confidence level of the single predicted value of the first KPI is equal to or exceeds a second threshold, 208. The advantage of this embodiment is that it prevents triggering network management operations in situations when accuracy of the prediction is below a certain threshold, where the confidence level is indicative of the accuracy.

Preferably, the operations of predicting and combining the individual predictions into the single predicted value of the first KPI are carried out periodically. Also preferably, each of the individual machine-learning processes has a parameter indicative of viability of said individual machine-learning process. When a new cycle starts the apparatus executing the method receives a set of KPI values from network elements. These are actual values, read or otherwise determined by network elements and delivered to the apparatus executing the method in accordance with one embodiment of the present invention. One of these values is the actual value of the first KPI that has been predicted by the method in the previous cycle. Preferably, in each cycle the method comprises increasing the value of the parameter indicative of viability of these individual machine-learning processes depending on accuracy of predictions by these individual machine-learning processes in previous cycle. With the known actual value and the single predicted value obtained in the previous cycle a new cycle starts with increasing the parameters indicative of viability of said individual machine-learning process based on accuracy of predictions. On the other hand, for each individual machine-learning process the method comprises reducing the value of the parameter indicative of viability corresponding to energy cost required for carrying out the operation of predicting in current cycle. For the machine-learning process to operate its parameter indicative of viability must be more than zero.

Preferably, the value of the parameter indicative of viability of an individual machine-learning process is increased for a defined number of individual machine-learning processes which made most accurate predictions. In other words, only x most accurate machine-learning processes are rewarded with increase of the parameter indicative of viability. Alternatively, the value of the parameter indicative of viability of an individual machine-learning process is increased for these individual machine-learning processes which predicted values of the first KPI fell within a defined range around actual value of the first KPI. The first of these approaches is advantageous when we want to maintain a population of machine-learning processes capable of handling a broad spectrum of KPI characteristics. In this approach the some of the x predicted values may be really remote from the actual one, but we still want to keep these machine-learning processes running because they may be good at prediction of KPIs having different characteristics. The second approach may be advantageous in predicting values of a single KPI or a set of KPIs having similar characteristics. In this approach machine-learning processes making inaccurate predictions (i.e. outside of the defined range) will not be rewarded and eventually eliminated from the population when, after reducing the value of the parameter indicative of viability by a value corresponding to energy cost required for carrying out the operation of predicting in the current cycle, the value of said parameter drops to zero or below. This allows for training a highly specialised population of machine-learning processes.

Figure 3:
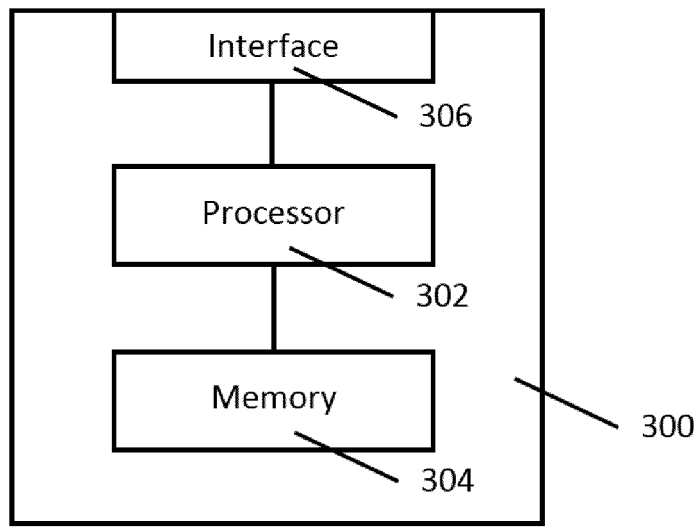
FIG. 3 is a diagram illustrating an embodiment of an apparatus for controlling operation of a communications network based on predicting a KPI value.

With reference to FIG. 3 an embodiment of an apparatus, 300, for controlling operation of a communications network based on predicting a value of a first Key Performance Indicator, KPI, is now to be described. The apparatus, 300, comprises a processor, 302, and a memory, 304. The memory, 304, contains instructions executable by the processor, 302, such that the apparatus is operative to carry out the method described in the earlier embodiments. In operation the apparatus, 300, is operative to maintain a plurality of machine-learning processes, wherein an individual machine-learning process operates based on a data model and decision-making rules. The data model and decision-making rules make up a predicting logic of said individual machine-learning process. The plurality of machine-learning processes operate based on a plurality of different data models and a plurality of different decision-making rules. Different combinations are possible; for example, the same data model may be used by a number of machine-learning processes and then each of these machine-learning processes use a different set of decision-making rules. Alternatively, the same set of decision-making rules may be used by a number of machine-learning processes and then each of these machine-learning processes use a different data model. Other combinations are also possible: only unique data models, only unique decision-making rules. Such a diversity of machine-learning processes gives a broad spectrum of decision logic employed to predict KPI values and increase likelihood of having a member of the population producing accurate predictions. The apparatus, 300, is further operative to receive a stream of values of Key Performance Indicators, KPIs, obtained from network elements of the communications network and then to predict, by the plurality of machine-learning processes a plurality of future values of said first KPI, wherein the future values of said first KPI refer to the same point in time. The predictions are based on previously received values of KPIs and uses the predicting logic. The apparatus, 300, is also operative to combine the individual predictions into a single predicted value of the first KPI and to trigger a network management operation if the single predicted first KPI value is equal to or exceeds a first threshold.

Preferably, the apparatus is operative to calculate the single predicted value of the first KPI as a weighted average, wherein a weight of an individual prediction depends at least on a confidence level of said individual prediction. In a further preferred embodiment, the apparatus is operative to determine a confidence level of the single predicted value of the first KPI.

The confidence level of the single predicted value of the first KPI may be an average of the confidence levels of the individual predictions, which fell within a predefined range around the single predicted value of the first KPI. If the confidence level of the single predicted value of the first KPI is equal to or exceeds a second threshold the apparatus is operative to trigger the network management operation. Crossing the second threshold indicates that not only the predicted first KPI is expected to cross a first threshold, but also indicates that the accuracy of the prediction (indicated by the confidence level of the single predicted value of the first KPI) is high enough to be trusted. The first and second thresholds preferably are configurable for specific deployments.

The apparatus, 300, is operative to periodically carry out the operations of predicting and combining the individual predictions into the single predicted value of the first KPI. Preferably, each of the individual machine-learning processes has a parameter indicative of viability of said individual machine-learning process and in each cycle the apparatus is further operative to increase the value of the parameter indicative of viability of these individual machine-learning processes depending on accuracy of predictions by these individual machine-learning processes in previous cycle. This is performed at the beginning of a cycle, when actual value of the first KPI is available. This value is then compared with the predictions made in the previous cycle and based on differences between the actual value and the predictions the machine-learning processes are rewarded accordingly by increasing the values of their respective parameters indicative of viability. On the other hand, for each individual machine-learning process, the apparatus is operative to reduce the value of the parameter indicative of viability corresponding to energy cost required for carrying out the operation of predicting in the current cycle. Carrying out predictions cost energy (reduces viability) and each machine-learning process at the end of a cycle has the parameter indicative of viability reduced. The balance between viability reward and expense determines how good at predicting the first KPI value a machine-learning process is. A machine-learning process that repeatedly makes inaccurate predictions loses its viability faster than it gets rewarded and eventually is eliminated from the set of machine-learning processes. On the other hand, a machine-learning process that repeatedly makes accurate predictions has gets more energy in the form of rewards that it spends on prediction and it may reproduce.

In one embodiment the apparatus, 300, is operative to allocate to each of the plurality of machine-learning processes a time-slot on the processor, 302, for executing the prediction logic and to predict a future value of said first KPI. In this embodiment the machine-learning processes get their turn on the processor one after another. Alternatively, the apparatus is operative to execute in parallel the prediction logic of a plurality of the machine-learning processes on the processor, 302, and to predict the plurality of future values of said first KPI. The parallel execution of the prediction logic may be implemented in such a way that all of the machine-learning processes have their code of prediction logic executed simultaneously, or, alternatively, a combination of parallel and serial operation is employed. In this embodiment a subset of the machine-learning processes have their code of prediction logic executed simultaneously and after that a next subset is executed until all machine-learning processes had a go.

The apparatus, 300, further comprises an interface, 306, for connecting to the network and via said network to other elements of the network.

Figure 7:
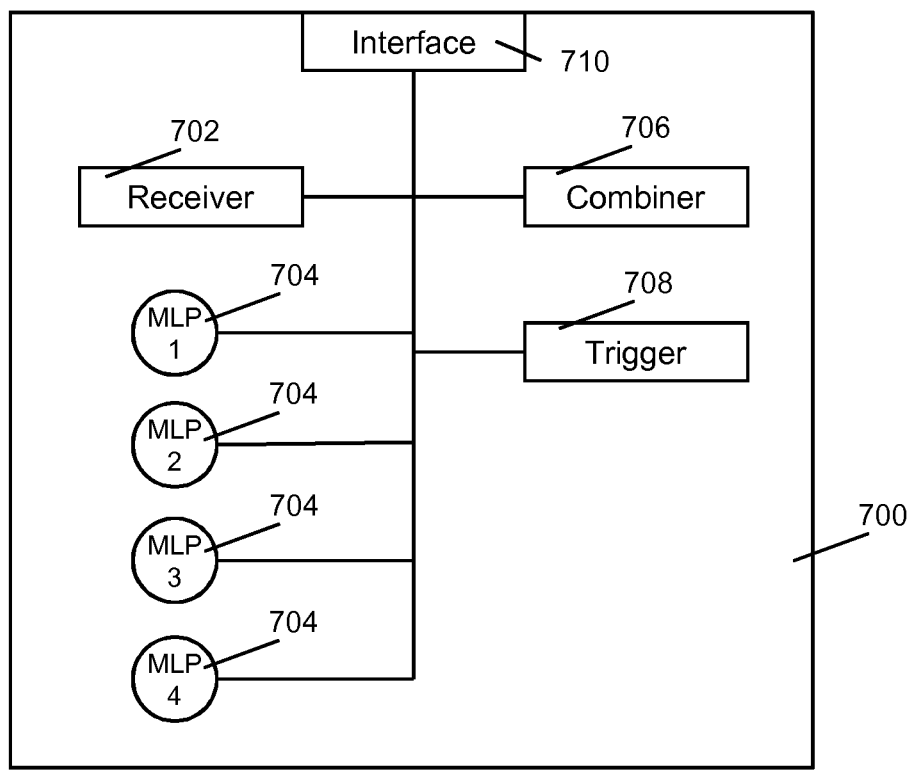
FIG. 7 is a diagram illustrating an alternative embodiment of an apparatus for controlling operation of a communications network based on predicting a KPI value.

With reference to FIG. 7 an alternative embodiment of an apparatus, 700, for controlling operation of a communications network based on predicting a value of a first Key Performance Indicator, KPI, will be described. The apparatus, 700, comprises a receiver, 702, for receiving a stream of values of Key Performance Indicators, KPIs, obtained from network elements of the communications network. The apparatus also comprises a plurality of machine-learning processes, 704, for predicting a plurality of future values of said first KPI referring to the same point in time. An individual machine-learning process, 704, operates based on a data model and decision-making rules making up a predicting logic of said individual machine-learning process. The machine-learning processes, 704, are adapted to operate based on a plurality of different data models and a plurality of different decision-making rules. The machine-learning processes, 704, are also adapted to make the predictions based on previously received values of KPIs and using the predicting logic. The apparatus, 700, further comprises a combiner, 706, for combining the individual predictions into a single predicted value of the first KPI and a trigger, 708, for triggering a network management operation if the single predicted first KPI value is equal to or exceeds a first threshold. Moreover, the apparatus, 700, comprises an interface, 710, for connecting to the network and via said network to other elements of the network.

For better understanding of embodiments of the invention the above and additional details of the solution will now be described by drawing analogy to a population of live species (artificial life).

Each machine-learning process' traits are encoded in a binary string, similar to the way the traits of a biological organism are encoded in its DNA. When two processes mate, their strings are recombined to produce the offspring's string. As a result, the offspring inherit a mixture of their parents' traits. These traits include the configuration parameters for the machine learning algorithms comprising the brain (learning and decision-making rules), so parents that make good predictions are likely to have offspring that make good predictions. The machine-learning processes that make the most accurate predictions receive more frequent energy rewards and tend to live longer and produce more offspring. Thus, each generation tends to make better predictions than the previous generation. This is in addition to the learning a machine-learning process does during its lifetime. The predictions of the current population of machine-learning processes may be weighted by one or more factors. The examples of weighting factors include machine-learning process age, confidence level, and historical accuracy. In one embodiment, the weighted predictions of the current population of machine-learning processes are averaged to produce a single system prediction.

There are many advantages of the present invention in its various embodiments. While most quantitative forecasting methods are inflexible when it comes to weighing older data against newer data, evolution allows the weights used by machine-learning processes to vary between generations, in response to changing pattern characteristics in the data. In a preferred embodiment weights are part of a machine-learning process' configuration. While most machine-learning systems are "black boxes", it is relatively easy to find out why individual machine-learning processes make the decisions they do. Each machine-learning process' data model and decision-making rules can be examined directly. While the accuracy of most quantitative forecasting methods is highly dependent on the (fixed) configuration, evolution allows the configuration of the machine-learning processes to vary between generations, in response to changing pattern characteristics in the data. Each machine-learning process is an independent predictor, with its own configuration, so rather than relying on a single predictor, the solution presented here takes advantage of the "wisdom of crowds". Another advantage of this solution is that the accuracy of the solution is relatively insensitive to the configuration of the initial population of machine-learning processes—evolution will improve the configuration over time. The system can learn and then remember patterns that occur infrequently. Because machine-learning processes as an example of artificial life species reproduce sexually, the offspring are a blended combination of the parents' configuration parameters. By analogy to biological life suppose a gene setting (allele) encodes a value for a configuration parameter makes the learning and decision-making rules less accurate in making predictions most of the time, but highly accurate for patterns that occur infrequently. Machine-learning processes that inherit one copy of the allele from a parent can be accurate predictors in general, assuming they inherit a different allele from the other parent. The allele remains in the gene pool, and is available to future generations. Machine-learning processes that inherit two copies will usually make inaccurate predictions, and thus will be at a survival disadvantage, and likely not live long. However, when the infrequent pattern arises, the machine-learning processes that inherit two copies will have a survival advantage.

Figure 4:
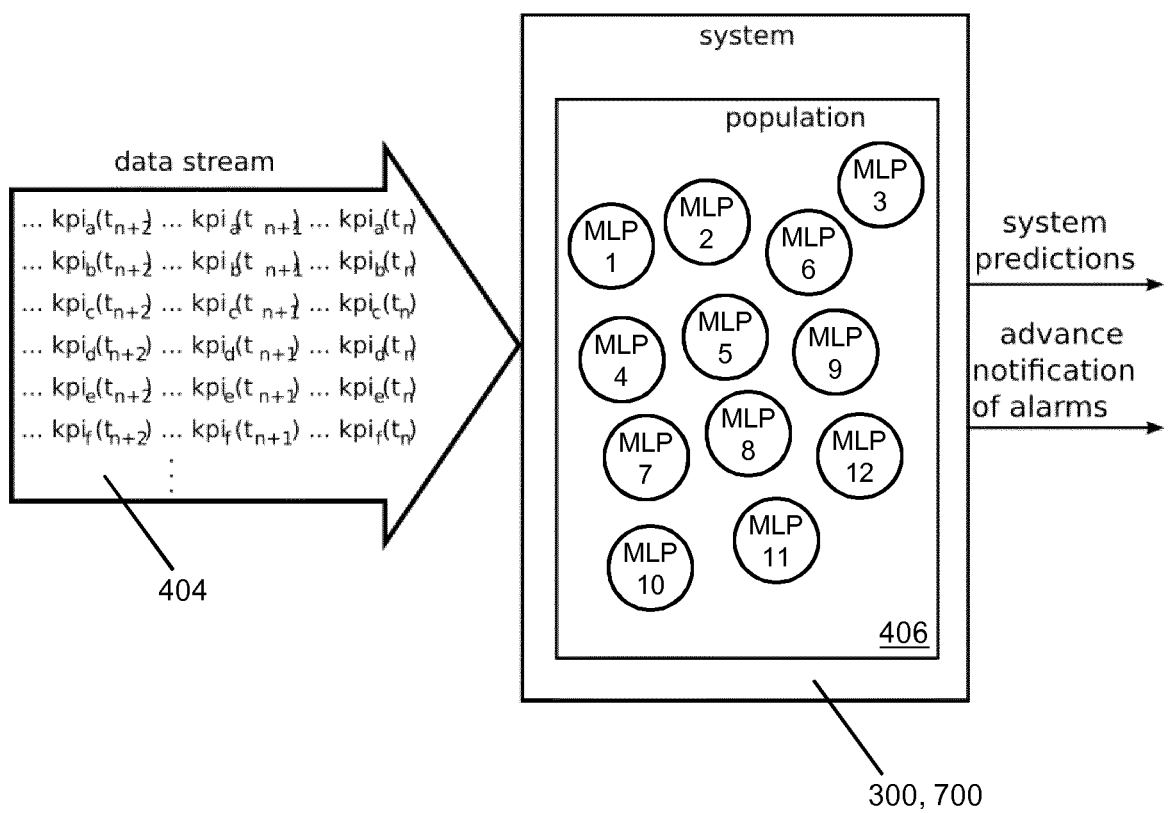
FIG. 4 is a diagram illustrating operation of the apparatus of FIG. 3 in execution of the method illustrated in FIG. 1 or FIG. 2.

FIG. 4 illustrates the overall flow of the method in apparatus 300, 700. The apparatus, 300, 700, receives KPI values, 404, as they are available. Each time a new set of KPI values, 404, arrives, the population, 406, of machine-learning processes generates predictions for the next value of the KPI of interest. The individual predictions are combined into a single system prediction. If the system has sufficient confidence that the next value of the KPI will breach the threshold, the operator is notified. The apparatus, 300, 700, as described here predicts the next value of a single KPI based on the current values of a plurality of KPIs. However, in alternative embodiments, it could be extended to predict plurality of KPIs, to make predictions based on older KPI values as well as current values, or to make predictions farther into the future.

Figure 5:
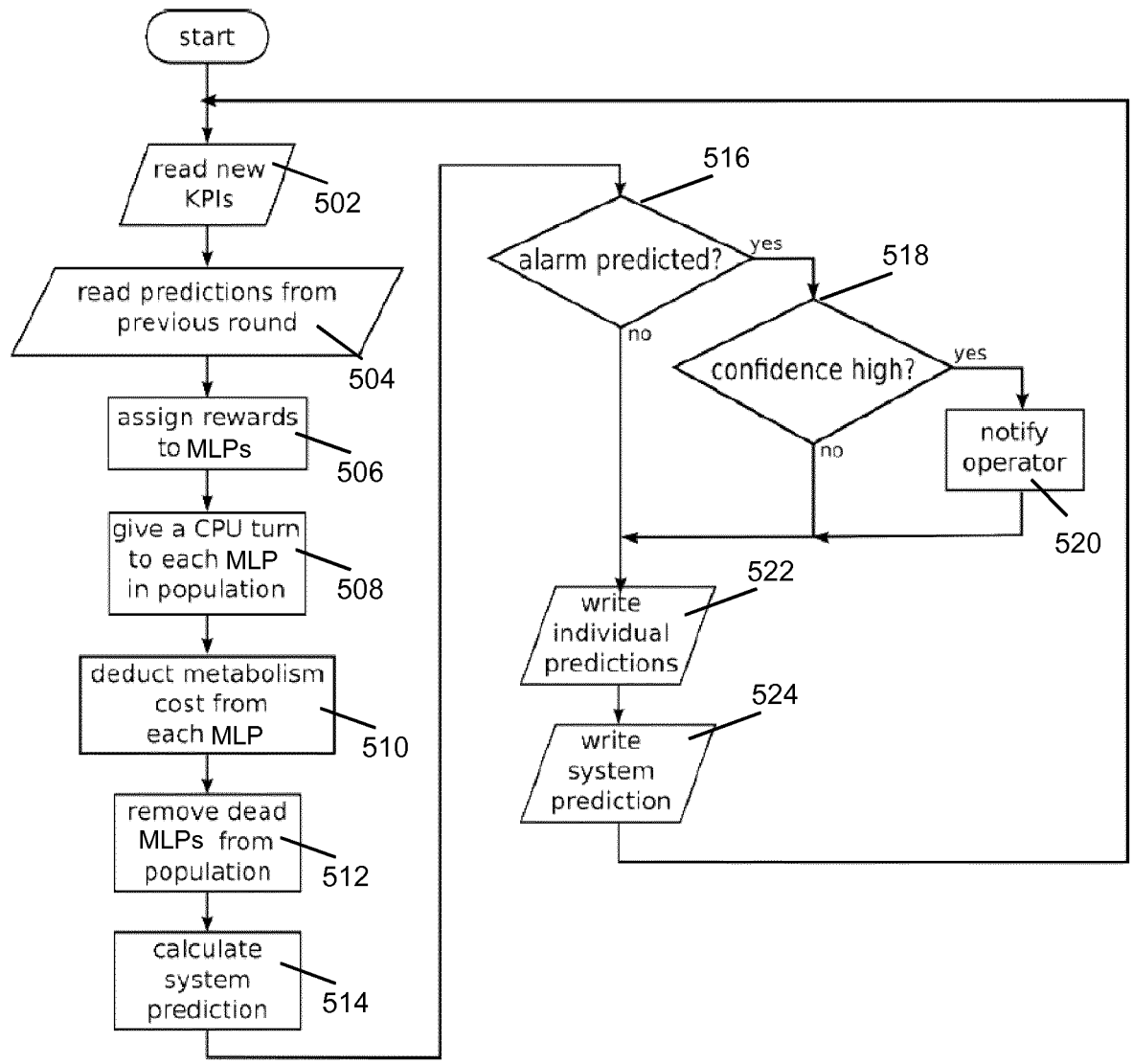
FIG. 5 is one alternative illustration of an embodiment of a method for controlling operation of a communications network based on predicting a KPI value.

FIG. 5 illustrates one embodiment of the overall process. A round begins when a new set of KPI values is available. At the start of the round, the new KPI values, and the predictions from the previous round, are read, 502. A reward is assigned, 506, to each machine-learning process based on how accurate its last prediction was, 504. Preferably, each machine-learning process is given its reward, provided with the new KPI values, and given a turn, 508, to make a prediction and potentially mate. In this embodiment during its turn a machine-learning process is given access to the CPU (Central Processing Unit, or processor) to execute its code. The details of the machine-learning processes' turn are discussed in FIG. 6. In an alternative embodiment a plurality of machine-learning processes execute their code on a processor in parallel. It is also possible to implement the method as a combination of serial and parallel execution of prediction logic (code) of the plurality of machine-learning processes. The processor has a limited capacity and, for example, can effectively execute code for 100 of the machine-learning processes. If the population of the machine-learning processes is 100 then all of them can be run in parallel. If, however, the population is 500 then a combination of serial and parallel execution may be employed. In each turn 100 machine-learning processes are executed and produce their predicted values of the first KPI and this step is repeated five times until all machine-learning processes produced their predictions.

Next, the metabolism cost is deducted, 510, from each machine-learning processes' energy level. This metabolism cost is based on the size of the machine-learning processes' brain which discourages them from growing larger brains than necessary and wasting processing resources. Adult machine-learning processes also pay the metabolism cost of any children they are rearing. When a machine-learning process' energy reaches zero (after deducting the metabolism cost), it is considered dead, and is removed from the population, 512. The predictions of the individual machine-learning processes are combined into a single system prediction, 514. In a preferred embodiment this may be done using a weighted average, where the weight of a machine-learning process' prediction depends on its age and confidence level. The system confidence level (i.e., the system's confidence in its prediction) is the average of the confidence level of the individual machine-learning processes that made predictions which agree with the system prediction. If the system prediction would breach a threshold for that KPI, then an alarm is predicted, 516. If in addition, the system confidence level is high, 518, the network operator is notified, 520. Finally, the predictions are recorded, 522, 524.

Figure 6:
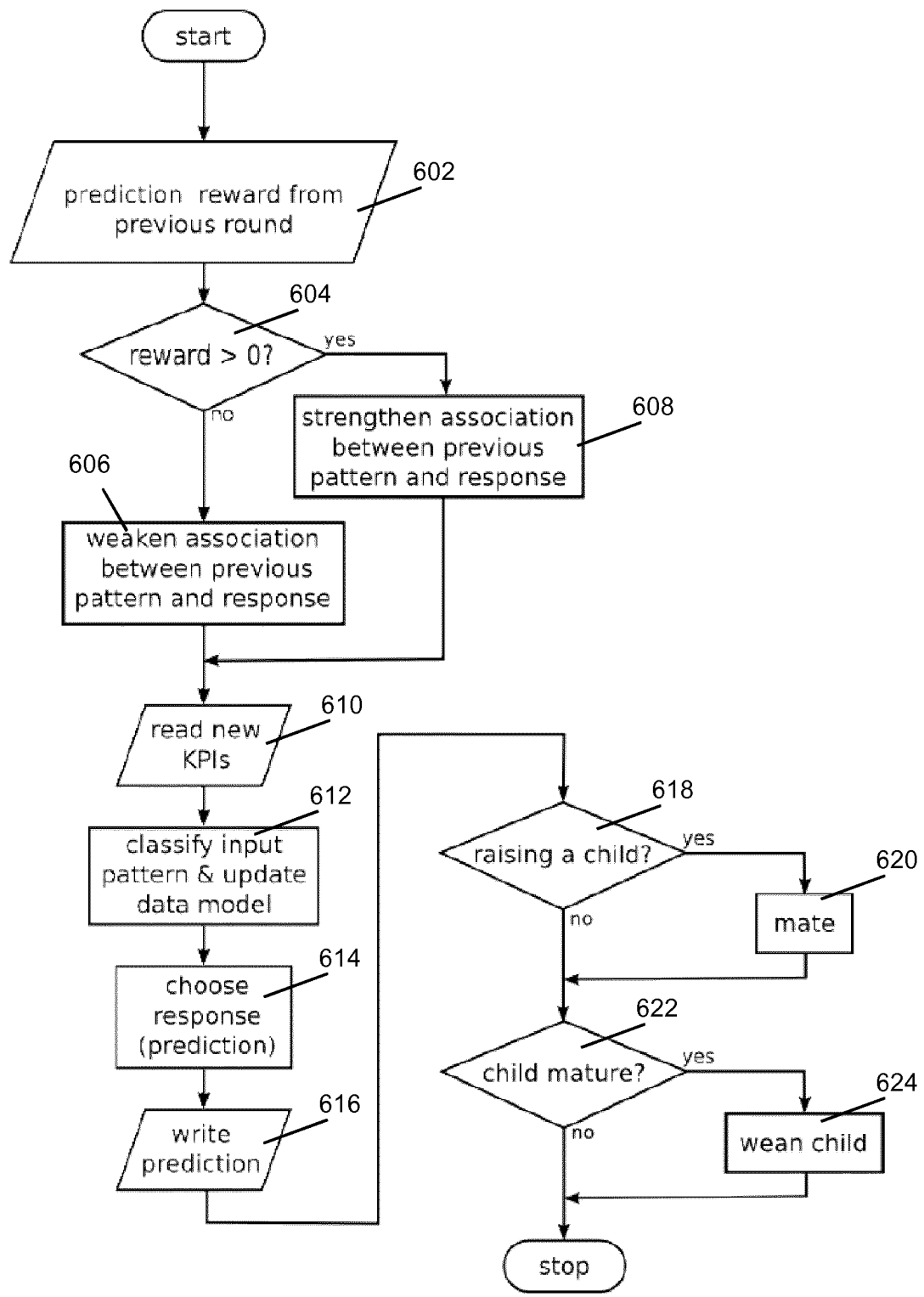
FIG. 6 illustrates actions performed in the embodiment illustrated in FIG. 5 by an individual machine-learning process.

FIG. 6 shows actions performed in a preferred embodiment illustrated in FIG. 5 by an individual machine-learning process. At the start of its turn, a machine-learning process receives a reward, 602, between 0 and 1 based on the accuracy of its prediction from the previous round. If the reward is zero, 604, the machine-learning processes' brain will weaken, 606, the association between the pattern it identified in the previous round, and its prediction. This will make the machine-learning process less likely in future to make the same prediction in similar scenarios. If the reward is above zero, 604, the learning and decision-making rules will strengthen, 608, the association, making the machine-learning process more likely to make the same prediction in similar scenarios. The association will be strongest if the reward is one.

Next, the machine-learning process reads, 610, a new set of KPIs received and compares the current scenario to its data model, and, preferably, assigns the ID of the most similar pattern to it. This is illustrated as classifying pattern of the input KPIs, 612. It also updates, 612, the data model to incorporate the new scenario. The machine-learning process then examines previous predictions it has made in response to this scenario, and chooses, 614, the prediction that is most likely to lead to a positive reward. The machine-learning process outputs this prediction. This is done by writing the prediction to an interface (e.g. a text file), 616. Next, if the machine-learning process is not currently raising a child, it may mate, 618, 620. Any resulting offspring will remain with the machine-learning process that initiates the mating. As long as the child remains with the parent, it will see the same KPIs as the parent, observe the decisions made by the parent, and learn from them. Finally, any children that have reached the age of maturity are "weaned", 622, 624; that is, they become independent, ready to make their own predictions.

In one embodiment the solution based on embodiments of this invention may be used to predict KPIs for a telecoms radio network to identify when an increase in capacity is required, or when energy-saving features can be activated or deactivated.

In an alternative embodiment the invention may be applicable in the Internet of Things (IoT) domain. IoT refers to a network of devices which contain electronics, software, sensors, actuators, and network interfaces which allow the objects to collect and exchange data. Such devices may include vehicles, buildings, air conditioning, wearable computers, smartphones, security systems, and home automation devices. With a large number of devices, each being capable of sending and receiving data it is possible that when certain conditions are met the data transmitted may lead to congestion. Some of these conditions may be very difficult or even impossible to predict using state of the art techniques, but a solution based on a population of machine-learning processes may train to detect patterns that lead to dramatic increase of volume of transmitted data. This invention could be used to predict KPIs for IoT, allowing the network operator to detect an increase in usage and in consequence reduce the flow of data to prevent congestion.

REFERENCES

[1] de Buitléir, Amy, Russell, Michael and Daly, Mark. "Wains: A pattern-seeking artificial life species." Artificial Life 18, no. 4 (2012): 399-423.

The invention claimed is:

1. A method for controlling operation of a communications network based on predicting a value of a first Key Performance Indicator, KPI, the method comprising:
maintaining a plurality of machine-learning processes, wherein an individual machine-learning process operates based on a data model and decision-making rules, wherein the plurality of machine-learning processes operate based on a plurality of different data models and a plurality of different decision-making rules;
receiving a stream of values of Key Performance Indicators, KPIs, obtained from network elements of the communications network;
predicting by the plurality of machine-learning processes, based on previously received values of KPIs and using the data models and decision-making rules, a plurality of future values of said first KPI, wherein the plurality of future values of said first KPI refer to a same point in time;
combining the plurality of future values of the first KPI that refer to the same point in time into a single predicted value of the first KPI, wherein the single predicted value of the first KPI is calculated as a weighted average, wherein a weight of a particular one of the plurality of future values depends at least on a confidence level of the particular one of the plurality of values; and
triggering a network management operation if the single predicted value of the first KPI is equal to or exceeds a first threshold.

2. The method according to claim 1 further comprising determining a confidence level of the single predicted value of the first KPI.

3. The method according to claim 2, wherein the confidence level of the single predicted value of the first KPI is an average of the confidence levels of the plurality of future values, which fell within a predefined range around the single predicted value of the KPI.

4. The method according to claim 2, wherein the network management operation is triggered if the confidence level of the single predicted value of the first KPI is equal to or exceeds a second threshold.

5. The method according to claim 1, wherein each of the individual machine-learning processes has a parameter indicative of viability of said individual machine-learning process and wherein the operations of predicting and combining the plurality of future values into the single predicted value of the first KPI are carried out periodically, and in each cycle the method comprises:
increasing the value of the parameter indicative of viability of the individual machine-learning processes depending on accuracy of the plurality of future values by the individual machine-learning processes in previous cycle;
for each individual machine-learning process, reducing the value of the parameter indicative of viability corresponding to energy cost required for carrying out the operation of predicting in current cycle.

6. The method according to claim 5, wherein the value of the parameter indicative of viability of an individual machine-learning process is increased for a defined number of individual machine-learning processes which made most accurate predictions.

7. The method according to claim 5, wherein the value of the parameter indicative of viability of an individual machine-learning process is increased for individual machine-learning processes which the plurality of future values of the first KPI falling within a range around actual value of the first KPI.

8. The method according to claim 1, wherein in the step of predicting each of the plurality of machine-learning processes is allocated a time-slot on a processor for executing the data model and decision-making rules and predict a future value of said first KPI.

9. The method according to claim 1, wherein in the step of predicting a plurality of machine-learning processes execute their data models and decision-making rules in parallel on a processor and predict the plurality of future values of said first KPI.

10. An apparatus for controlling operation of a communications network based on predicting a value of a first Key Performance Indicator, KPI, the apparatus comprising a processor and a memory, the memory containing instructions executable by the processor such that the apparatus is operative to:
maintain a plurality of machine-learning processes, wherein an individual machine-learning process operates based on a data model and decision-making rules, wherein the plurality of machine-learning processes operate based on a plurality of different data models and a plurality of different decision-making rules;
receive a stream of values of Key Performance Indicators, KPIs, obtained from network elements of the communications network;

predict by the plurality of machine-learning processes, based on previously received values of KPIs and using the data models and decision-making rules, a plurality of future values of said first KPI, wherein the plurality of future values of said first KPI refer to the same point in time;

combine the plurality of future values of the first KPI that refer to the same point in time into a single predicted value of the first KPI, wherein the single predicted value of the first KPI is calculated as a weighted average, wherein a weight of a particular one of the plurality of future values depends at least on a confidence level of the particular one of the plurality of values; and trigger a network management operation if the single predicted value of the first KPI is equal to or exceeds a first threshold.

11. The apparatus according to claim 10, wherein the apparatus is further operative to determine a confidence level of the single predicted value of the first KPI.

12. The apparatus according to claim 11, wherein the confidence level of the single predicted value of the first KPI is an average of the confidence levels of the plurality of future values, which fell within a predefined range around the single predicted value of the KPI.

13. The apparatus according to claim 11, wherein the apparatus is operative to trigger the network management operation if the confidence level of the single predicted value of the first KPI is equal to or exceeds a second threshold.

14. The apparatus according to claim 10, wherein each of the individual machine-learning processes has a parameter indicative of viability of said individual machine-learning process and wherein the apparatus is operative to periodically carry out the operations of predicting and combining the plurality of future values into the single predicted value of the first KPI, and in each cycle the apparatus is further operative to:

increase the value of the parameter indicative of viability of the individual machine-learning processes depending on accuracy of the plurality of future values by the individual machine-learning processes in previous cycle;

for each individual machine-learning process, reduce the value of the parameter indicative of viability corresponding to energy cost required for carrying out the operation of predicting in the current cycle.

15. The apparatus according to claim 10, wherein the apparatus is operative to allocate to each of the plurality of machine-learning processes a time-slot on the processor for executing the data model and decision-making rules and predict a future value of said first KPI.

16. The apparatus according to claim 10, wherein the apparatus is operative to execute in parallel the data models and decision-making rules of a plurality of the machine-learning processes on a processor and predict the plurality of future values of said first KPI.

17. An apparatus for controlling operation of a communications network based on predicting a value of a first Key Performance Indicator, KPI, the apparatus comprising:

a receiver for receiving a stream of values of Key Performance Indicators, KPIs, obtained from network elements of the communications network;

a plurality of machine-learning processes for predicting a plurality of future values of said first KPI referring to the same point in time, wherein an individual machine-learning process operates based on a data model and decision-making rules, the plurality of machine-learning processes are adapted to operate based on a plurality of different data models and a plurality of different decision-making rules and to make the predictions based on previously received values of KPIs and using the data models and decision-making rules, a combiner for combining the plurality of future values of the first KPI that refer to the same point in time into a single predicted value of the first KPI, wherein the single predicted value of the first KPI is calculated as a weighted average, wherein a weight of a particular one of the plurality of future values depends at least on a confidence level of the particular one of the plurality of values;

a trigger for triggering a network management operation if the single predicted value of the first KPI is equal to or exceeds a first threshold.

* * * * *